United States Patent
Reid (10) Patent No.: US 7,130,090 B2
(45) Date of Patent: Oct. 31, 2006

(54) METHOD OF OPERATING AN IMAGE-BASED DOCUMENT PROCESSING SYSTEM AND AN APPARATUS THEREFOR

(75) Inventor: Bruce A. Reid, Elmira (CA)

(73) Assignee: NCR Corporation, Dayton, OH (US)

( * ) Notice: Subject to any disclaimer, the term of this patent is extended or adjusted under 35 U.S.C. 154(b) by 1114 days.

(21) Appl. No.: 10/022,958

(22) Filed: Dec. 18, 2001

(65) Prior Publication Data

US 2003/0115071 A1 Jun. 19, 2003

(51) Int. Cl.
*H04N 1/46* (2006.01)

(52) U.S. Cl. .................. 358/475; 358/488; 358/496

(58) Field of Classification Search ............ 358/496, 358/475, 506, 505, 498, 474, 488, 486; 382/137, 382/135, 312, 318, 319; 399/367, 371; 250/234–236, 250/216, 559.11; 356/71, 72
See application file for complete search history.

(56) References Cited

U.S. PATENT DOCUMENTS

| | | | | |
|---|---|---|---|---|
| 4,723,072 A | * | 2/1988 | Naruse | 235/454 |
| 4,882,776 A | * | 11/1989 | Uzawa et al. | 398/127 |
| 5,241,406 A | | 8/1993 | Johnston et al. | 358/487 |
| 5,282,053 A | | 1/1994 | Robideau | 358/406 |
| 5,381,245 A | | 1/1995 | Johnston et al. | 358/487 |
| 5,751,601 A | | 5/1998 | Tang et al. | 702/104 |
| 5,844,697 A | | 12/1998 | Omvik et al. | 358/487 |
| 5,889,883 A | | 3/1999 | Simpkins | 382/135 |
| 5,987,186 A | | 11/1999 | Oida et al. | 382/274 |
| 6,016,207 A | | 1/2000 | Wield | 358/406 |
| 6,028,681 A | | 2/2000 | Gray et al. | 358/475 |
| 6,040,584 A | * | 3/2000 | Liu et al. | 250/559.11 |
| 6,163,385 A | | 12/2000 | Kajander | 358/475 |
| 6,970,235 B1 | * | 11/2005 | Christophersen | 356/71 |

FOREIGN PATENT DOCUMENTS

WO  WO0154076 A1 * 7/2001

* cited by examiner

*Primary Examiner*—Cheukfan Lee
(74) *Attorney, Agent, or Firm*—Michael Chan (57) ABSTRACT

A check processing system comprises an image capture module including a controllable image capture device disposed along a first side of the document track. The image capture device captures an image of a document item moving from an upstream end of a document track to a downstream end of the document track. An energizeable first light source is disposed on a second side of the document track and faces the image capture device and is provided for, when energized, illuminating the document item to allow the image capture device to detect a leading edge of the document item as the document item moves from the upstream end to the downstream end. An energizeable second light source is disposed on a second side of the document track and is provided for, when energized, illuminating a document item in the document track to allow the image capture device to capture an image of the document item as the document item moves from the upstream end to the downstream end. A translucent reference surface is disposed between the first and second light sources and is provided for (i) passing through light from the first light source to illuminate a document item in the document track to allow the image capture device to detect a leading edge of the document item as the document item moves from the upstream end to the downstream end, and (ii) reflecting light from the second light source to the image capture device to allow the image capture device to be calibrated. A pocketing module includes at least one pocket for receiving a document item after the image capture device has captured an image of the document item.

17 Claims, 6 Drawing Sheets

METHOD OF OPERATING AN IMAGE-BASED DOCUMENT PROCESSING SYSTEM AND AN APPARATUS THEREFOR

BACKGROUND OF THE INVENTION

The present invention relates to image-based document processing systems, and is particularly directed to a method of operating an image-based document processing system, such as an image-based check processing system, and an apparatus therefor.

A typical image-based check processing system includes a check processing transport which has a document track and a number of check processing modules positioned along the document track for performing specific document processing operations on document items including checks moving downstream along the document track. Each check processing module includes a number of hardware devices contained within the check processing module during operation of the check processing transport. The check processing system also includes a transport processor which executes a transport application program which is stored in memory to control operation of the hardware devices contained within the check processing modules positioned along the document track and thereby to control operation of the check processing transport.

More specifically, the check processing transport includes a hopper module into which a stack of document items are placed. A document feeder module adjacent the hopper module selectively feeds or drives each document item from the stack of document items in the hopper module to transport the document item past an imaging camera of an image capture module. The imaging camera captures an image of the document item. The document item moves downstream along the document track to sorting pockets of a pocket module located at the end of the document track. The pockets receive document items which have been sorted in accordance with the transport application program.

In some known check processing transports, the imaging camera lies on one side of the document track and a movable reference surface lies on the other side of the document track facing the imaging camera. The reference surface has a black surface portion and a white surface portion and is movable between one position in which only the black surface portion faces the imaging camera and another position in which only the white surface portion faces the imaging camera. The black surface portion of the reference surface faces the imaging camera during operation of the imaging camera. The sharp contrast between the dark, black surface portion of the reference surface and the relatively light background of a document item allows the leading edge of the document item to be accurately detected. The white surface portion of the reference surface faces the imaging camera during calibration of the imaging camera. The white surface portion of the reference surface is usually entirely white to allow a complete calibration of the imaging camera to be carried out.

In some other known check processing transports, the imaging camera lies on one side of the document track and a stationary reference surface lies on the other side of the document track facing the imaging camera. The stationary reference surface usually has a white surface portion and a number of black markings contained throughout the white surface portion. The white surface portion and the black markings face the imaging camera and are always in the same position relative to the imaging camera. The black markings allow the edges of a document item to be detected, while the white surface portion allows the imaging camera to be calibrated.

Although using a known movable reference surface with black and white surface portions allows a complete calibration of an imaging camera in a check processing transport to be carried out, a drawback is that mechanical components are needed to move a movable reference surface between different positions. These mechanical components need to be serviced regularly to maintain their proper operation. Also, although using a known stationary reference surface with black markings in a white surface portion does not require use of mechanical components, a drawback is that a complete calibration of an imaging camera of a check processing transport is unable to be carried out. Accordingly, it would be desirable to provide a stationary reference surface which allows an imaging camera of a check processing transport to be completely calibrated.

SUMMARY OF THE INVENTION

In accordance with one aspect of the present invention, an apparatus is provided for use in an image-based document processing system having a document track and a controllable image capture device along the document track. The apparatus comprises an energizeable first light source facing the image capture device and for, when energized, illuminating a document item in the document track to allow the image capture device to detect a leading edge of the document item. An energizeable second light source is provided for, when energized, illuminating a document item in the document track to allow the image capture device to capture an image of the document item. A translucent reference surface is disposed between the first and second light sources and is provided for (i) passing through light from the first light source to the image capture device when the first light source is energized, and (ii) reflecting light from the second light source to the image capture device when the second light source is energized.

The apparatus may further comprise a controller for controlling the image capture device and the first and second light sources such that (i) the first light source is energized to provide light for passing through the translucent reference surface to the image capture device to allow the image capture device to detect a leading edge of a document item when no document item is in the document track between the first light source and the image capture device, (ii) the second light source is energized to provide light for reflecting from the document item to the imaging capture device to allow the image capture device to capture an image of a document item when a document item is in the document track between the first light source and the image capture device, and (iii) the image capture device is controlled to capture an image of a document item in the document track between the first light source and the image capture device after the image capture device has detected a leading edge of the document item. Each light source may comprise a linear array of light emitting diodes. The translucent reference surface may comprise an entirely white surface without any dark markings thereon.

The apparatus may further comprise a sensor device for (i) detecting a trailing edge of a document item in the document track, and (ii) providing a trailing edge signal indicative thereof. The sensor device is located along the document track upstream from the image capture device. The apparatus may further comprise a controller responsive to the trailing edge signal from the sensor and for controlling the image capture device and the first and second light sources such that (i) the first light source is energized to provide light for passing through the translucent reference surface to the image capture device to allow the image capture device to detect a leading edge of a document item when no document item is in the document track between the first light source and the image capture device, (ii) the second light source is energized to provide light for reflecting from the document item to the imaging capture device to allow the image capture device to capture an image of a document item when a document item is in the document track between the first light source and the image capture device, and (iii) the image capture device is controlled to capture an image of a document item in the document track between the first light source and the image capture device after the image capture device has detected a leading edge of the document item.

In accordance with another aspect of the present invention, an apparatus comprises means defining a document track along which document items can move from an upstream end to a downstream end. A controllable image capture device is disposed on a first side of the document track. A first light source is disposed on a second side of the document track and faces the image capture device and is provided for, when energized, illuminating a document item from behind in the document track to allow the image capture device to detect a leading edge of the document item as the document item moves from the upstream end to the downstream end. A second light source is disposed on the first side of the document track. A translucent reference surface is disposed between the first and second light sources and is provided for (i) passing through light from the first light to illuminate the document track to allow the image capture device to detect a leading edge of the document item as the document item moves from the upstream end to the downstream end, and (ii) reflecting light from the second light source to the image capture device to allow the image capture device to be calibrated. A controller is provided for controlling the image capture device and the first and second light sources such that (i) the first light source provides light for passing through the translucent reference surface to the image capture device to allow the image capture device to detect a leading edge of a document item when no document item is in the document track between the first light source and the image capture device, (ii) the second light source provides light for reflecting from the document item to the imaging capture device to allow the image capture device to capture an image of the document item when the document item is in the document track between the first light source and the image capture device and moving from the upstream end to the downstream end, and (iii) the image capture device is controlled to capture an image of a document item in the document track moving from the upstream end to the downstream end and between the first light source and the image capture device after the image capture device has detected a leading edge of the document item.

Each light source may comprise at least one light emitting diode. The translucent reference surface may comprise an entirely white surface without any dark markings thereon. The apparatus may further comprise a sensor device located along the document track upstream from the image capture device. The sensor device is provided for (i) detecting a trailing edge of a document item moving along the document track from the upstream end to the downstream end, and (ii) providing a trailing edge signal indicative thereof.

In accordance with still another aspect of the present invention, a check processing system comprises means defining at least a portion of a document track along which document items can move from an upstream end to a downstream end. An image capture module includes a controllable image capture device disposed along a first side of the document track and is provided for capturing an image of a document item moving from the upstream end of the document track to the downstream end of the document track. An energizeable first light source is disposed on a second side of the document track and faces the image capture device and is provided for, when energized, illuminating the document item to allow the image capture device to detect a leading edge of the document item as the document item moves from the upstream end to the downstream end. An energizeable second light source is disposed on a second side of the document track and is provided for, when energized, illuminating a document item in the document track to allow the image capture device to capture an image of the document item as the document item moves from the upstream end to the downstream end. A translucent reference surface is disposed between the first and second light sources and is provided for (i) passing through light from the first light source to illuminate a document item in the document track to allow the image capture device to detect a leading edge of the document item as the document item moves from the upstream end to the downstream end, and (ii) reflecting light from the second light source to the image capture device to allow the image capture device to be calibrated. A pocketing module includes at least one pocket for receiving a document item after the image capture device has captured an image of the document item.

Each light source may comprise at least one light emitting diode. The translucent reference surface may comprise an entirely white surface without any dark markings thereon. The check processing system may further comprise a sensor device located along the document track upstream from the image capture device. The sensor device is provided for (i) detecting a trailing edge of a document item moving along the document track from the upstream end to the downstream end, and (ii) providing a trailing edge signal indicative thereof. The check processing system may further comprise a controller responsive to the trailing edge signal from the sensor device and for controlling the image capture device and the first and second light sources such that (i) the first light source is energized to provide light for passing through the translucent reference surface to the image capture device to allow the image capture device to detect a leading edge of a document item when no document item is in the document track between the first light source and the image capture device, (ii) the second light source is energized to provide light for reflecting from the document item to the imaging capture device to allow the image capture device to capture an image of a document item when a document item is in the document track between the first light source and the image capture device and is moving from the upstream end to the downstream end, and (iii) the image capture device is controlled to capture an image of a document item in the document track moving from the upstream end to the downstream end between the first light source an the image capture device after the image capture device has detected a leading edge of the document item. The controller may comprise a transport processor for controlling operation of a number of check processing modules of the check processing transport.

In accordance with yet another aspect of the present invention, a method of operating an image-based document processing system comprises the steps of (a) energizing a first light source to provide light which passes through a translucent reference surface to an image capture device to allow the image capture device to detect a leading edge of a document item, and (b) after the image capture device detects a leading edge of a document item, energizing a second light source to provide light which reflects from the document item to the image capture device to allow the image capture device to capture an image of a document item.

The method may further comprise the step of (c) deenergizing the first light source after the image capture device detects a leading edge of a document item moving past the image capture device. The method may further comprise the step of (d) deenergizing the second light source after a trailing edge of a document item is detected. The method may further comprise the step of (c) deenergizing the second light source after a trailing edge of a document item is detected.

In accordance with another aspect of the present invention, a method of operating an image-based check processing system comprises the steps of (a) energizing a first light source to provide light which passes through a translucent reference surface to an image capture device to allow the image capture device to detect a leading edge of a document item, (b) after the image capture device detects a leading edge of a document item, energizing a second light source to provide light which reflects from the document item to the image capture device to allow the image capture device to capture an image of a document item, and (c) pocketing a document item after the image capture device has captured an image of the document item.

The method may further comprise the step of (d) deenergizing the first light source after the image capture device detects a leading edge of a document item. The method may further comprise the step of (e) deenergizing the second light source after a trailing edge of a document item is detected. The method may further comprising the step of (d) deenergizing the second light source after a trailing edge of a document item is detected.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILS OF THE INVENTION

Figure 1:
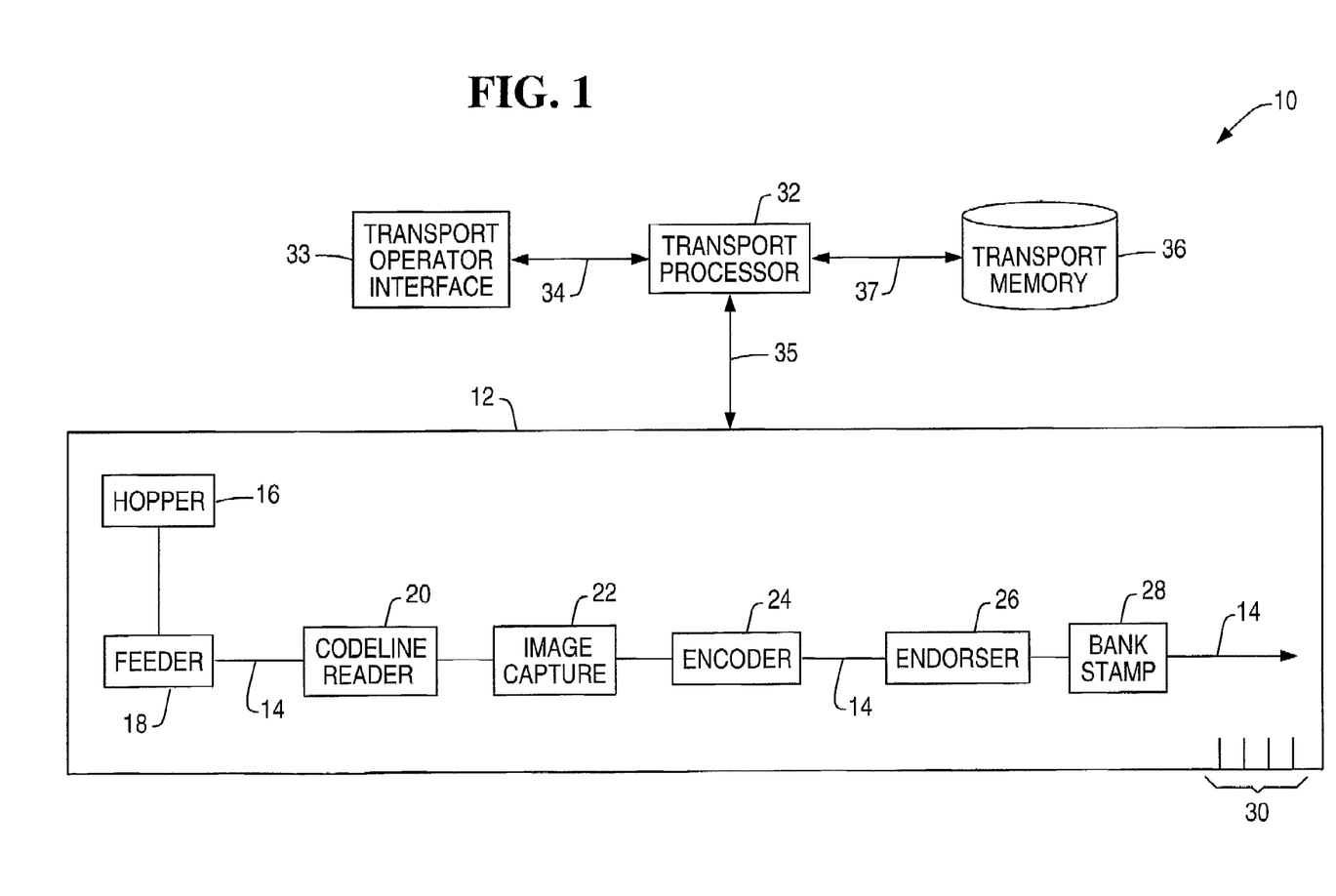
FIG. 1 is a schematic block representation of an image-based check processing system embodying the present invention.

The present invention is directed to a method of operating an image-based document processing system and an apparatus therefor. The specific construction and use of the document processing system may vary. By way of example, a document processing system in the form of an image-based check processing system 10 is illustrated in FIG. 1. The check processing system 10 may be, for example, a sorting machine or a proof machine wherein financial document items such as checks are processed in a data processing operation.

As shown in FIG. 1, the check processing system 10 includes a check processing transport 12 having a document track 14 along which financial document items, such as checks, can be transported from an upstream end to a downstream end. The transport 12 includes a number of different check processing modules lying along the document track 14. Each check processing module includes a number of hardware devices associated with the particular check processing module for performing specific document processing operations on document items moving along the document track. The transport 12 includes a hopper module 16 into which a stack of financial document items including checks are placed. A document feeder module 18 adjacent the hopper 16 selectively feeds or drives each document item from the stack of document items in the hopper to transport the document item from the upstream end to the downstream end along the document track 14 to sorting pockets of a pocket module 30 located at the end of the document track.

The check processing system 10 includes a codeline reader module 20 such as a MICR reader located along the document track 14. The MICR reader 20 reads a MICR codeline from each check being processed in a known manner. Alternatively, the codeline reader may be an OCR reader instead of a MICR reader depending upon the particular application. The check processing system 10 further includes an image capture module 22 located along the document track 14. The image capture module 22 captures an image of each document item for a number of different purposes well known in the financial industry. An encoder module 24 encodes missing fields on each check. An endorser module 26 applies an endorsement in a known manner to each check. A bank stamp module 28 stamps each check to identify the bank institution processing the check. The structure and operation of MICR readers, OCR readers, imaging cameras, encoders, endorsers, and bank stamps are well known and, therefore, will not be described.

The check processing system 10 further includes a transport processor 32 and a transport operator interface 33 which communicates via signals on line 34 with the transport processor. The operator interface 33 may include a keyboard, a mouse, and a display, all of which communicate via signals with the transport processor 32. The transport processor 32 controls operation of the transport 12 via signals on line 35. Suitable processors and memories are readily available in the marketplace. Their structure and operation are well known and, therefore, will not be described.

The check processing system 10 also includes a transport memory 36 which communicates via signals on line 37 with the transport processor 32. It is contemplated that the memory 36 could be a single memory unit or a plurality of different memory units. An executable transport application program is stored in the memory 36. The transport application program is associated with a particular type of document processing work. For example, one type of work is proof of deposit. Another type of work is remittance processing. Still another type of work may be sorting of document items. When the transport application program is executed, the hardware devices contained within the check processing modules lying along the document track 14 are controlled to process document items moving downstream along the document track in accordance with the transport application program, as is known. The memory 36 also stores sequence numbers, MICR codelines, image data, encoder status, endorsement status, and bank stamp status associated with document items which have been processed in accordance with the transport application program.

Figure 2:
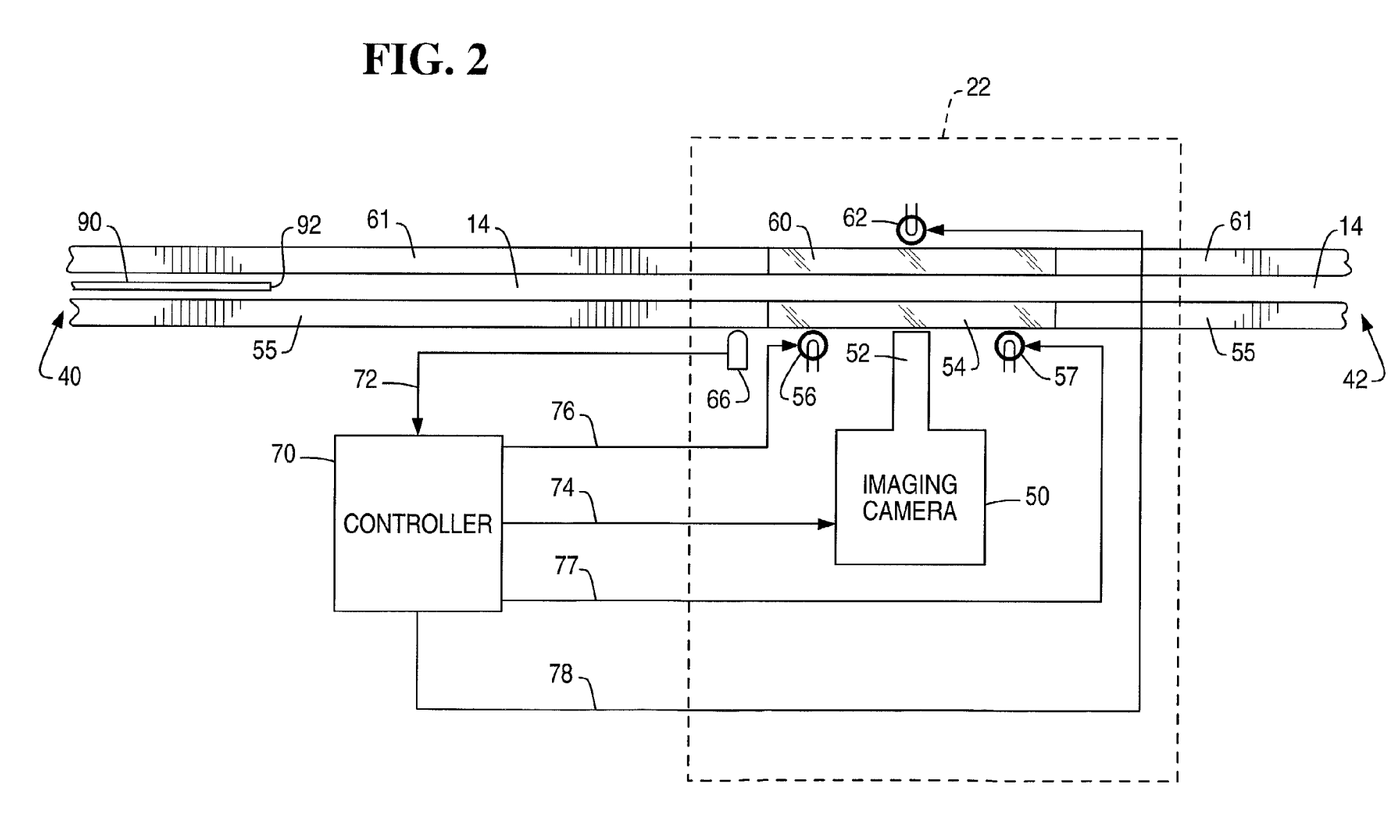
FIG. 2 is a schematic view of a portion of the image-based check processing system of FIG. 1 and showing a document item along a document track.

Referring to FIG. 2, the image capture module 22 includes an image capture device 50, such as an imaging camera, which is controlled to capture images of document items moving along the document track 14. The imaging camera 50 lies on one side of the document track 14 and has a lens portion 52 which lies adjacent a transparent flat piece 54 attached to a housing portion 55 of the image capture module 22. The transparent flat piece 54 protects the lens portion 52 from contacting document items moving along the document track 14 from an upstream end 40 to a downstream end 42.

A number of energizeable lighting sources 56, 57 lies on the same side of the document track 14 on which the imaging camera 50 lies. Although there are only two lighting sources 56, 57 shown in FIG. 2, it is contemplated that this number may be one or more than two. Each of the lighting sources 56, 57 is switchable ON and OFF, and preferably, comprises a linear array of light emitting diodes (LEDs) which extends into and out of the page as viewed looking at FIG. 2. The LEDs may be of any color, although white LEDs are preferred. When the lighting sources 56, 57 are energized, the lighting sources provide light which is reflected from a document item in the document track 14 to allow the imaging camera 50 to capture an image of the document item as the document item is moving along the document track 14 from the upstream end 40 to the downstream end 42.

A translucent reference surface 60 lies on the other side of the document track 14. The translucent reference surface 60 is attached to a housing portion 61 of the image capture module 22, and faces the transparent flat piece 54. The translucent reference surface 60 has a known reflectance relative to a typical document item such that the imaging camera 50 can be calibrated by imaging the translucent reference surface 60 when illuminated by the lighting sources 56, 57.

A number of energizeable lighting sources 62 lies on the same side of the document track 14 on which the translucent reference surface 60 lies. Although there is only one lighting source 62 shown in FIG. 2, it is contemplated that this number may be more than one. The lighting source 62 is switchable ON and OFF, and preferably, comprises a linear array of light emitting diodes (LEDs) which extends into and out of the page as viewed looking at FIG. 2. The LEDs may be of any color, although red LEDs are preferred. When the lighting source 62 is energized, the lighting source provides light which is transmitted through the translucent reference surface 60 to allow the imaging camera 50 to detect a leading edge of the document item as the document item is moving along the document track 14 from the upstream end 40 to the downstream end 42.

A sensor device 66 lies on the same side of the document track 14 on which the imaging camera 50 lies. The sensor device 66 is disposed along the document track 14 upstream from the imaging camera 50. The sensor device 66 provides a signal on line 72 indicative of a trailing edge of a document item in the document track 14 moving past the sensor device 66. Although the sensor device 66 is shown in FIG. 2 as being upstream from the imaging camera 50, it is conceivable that the sensor device 66 could have located at any position along the document track 14.

A controller 70 receives the signal on line 72 from the sensor device 66. The controller 70 is responsive to a number of different signals including the signal on line 72 from the sensor device 66 to control operation of the imaging camera 50 via line 74, the lighting sources 56, 57 via lines 76, 77, respectively, and the lighting source 62 via line 78. Although the controller 70 is shown in FIG. 2 as being separate from the image capture module 22, it is contemplated that the controller 70 may be part of the image capture module 22. Alternatively, the controller 70 may be at least a part of the transport processor 32 of the check processing system 10.

The controller 70 controls operation of the imaging camera 50, the lighting sources 56, 57, and the lighting source 62 in the following manner. As shown in FIG. 2, a document item 90 upstream from the image capture module 22 is moving along the document track 14 from the upstream end 40 to the downstream end 42. At this time, the lighting source 62 is energized and the lighting sources 56, 57 are deenergized. Light from the lighting source 62 passed through the translucent reference surface 60 to the lens portion 52 of the imaging camera 50. The imaging camera 50 receives light from the lighting source 62 which has passed through the translucent reference surface 60, and continuously scans for the presence of a leading edge of a document item in the document track 14. The scanning operation of the imaging camera 50 is well known and, therefore, will not be described.

Figure 3:
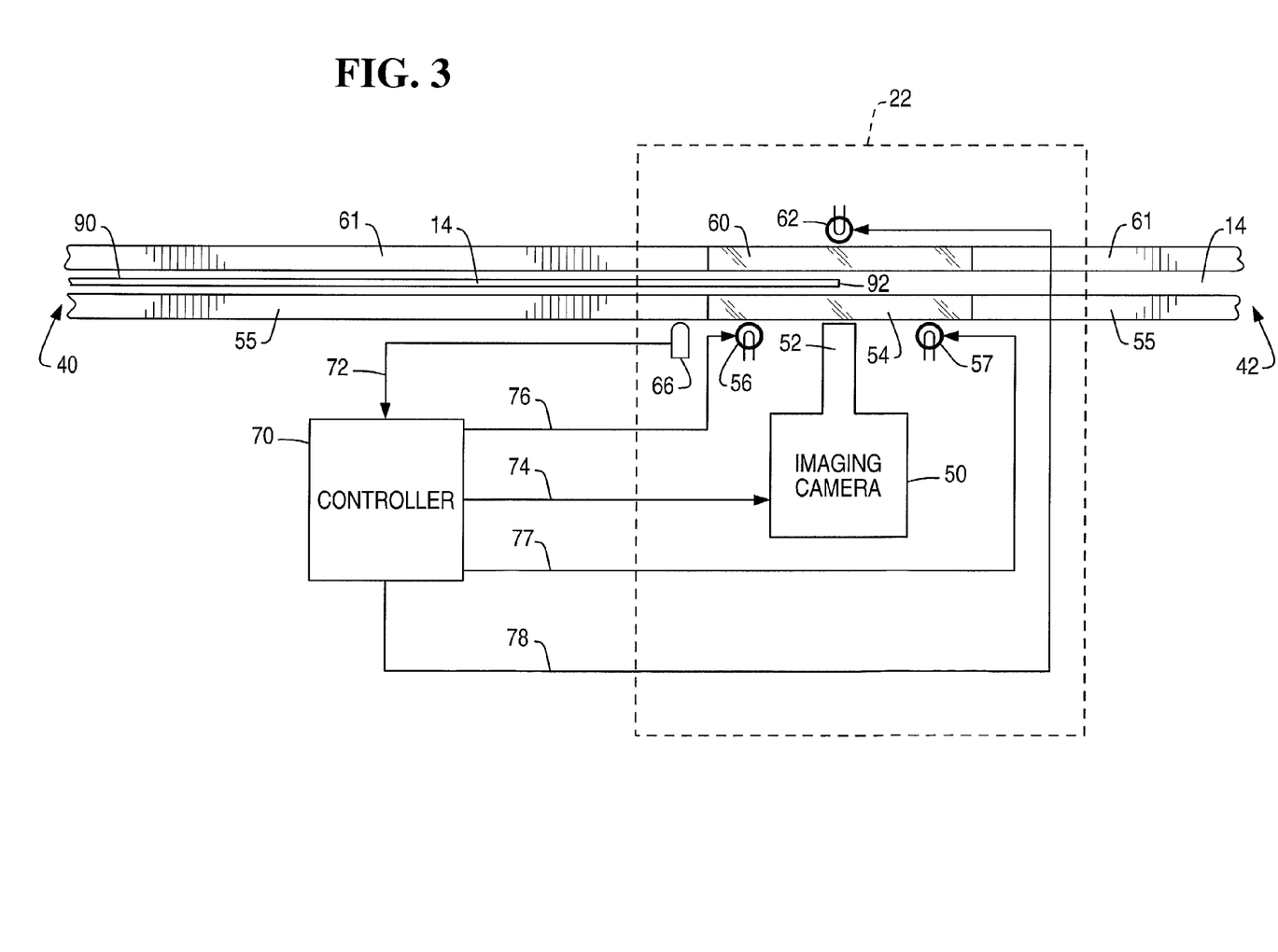
FIGS. 3–6 are views similar to FIG. 2 and showing the document item in a different position along the document track.

As the document item 90 shown in FIG. 2 continues to move downstream along the document track 14 and into that portion of the document track in the image capture module 22, a leading edge 92 of the document item 90 eventually arrives in front of lens portion 52 of the imaging camera 50, as shown in FIG. 3. When the leading edge 92 of the document item 90 arrives in front of the lens portion 52 of the imaging camera 50 as shown in FIG. 3, the imaging camera 50 detects presence of the leading edge 92 of the document item 90 because of the document item obscuring the light from lighting source 62. When the leading edge 92 of the document item 90 is detected, the lighting source 62 turns OFF, the lighting sources 56, 57 turn ON and the imaging camera 50 is controlled to continue scanning and to begin to capturing image data which is representative of an image of the document item 90. The captured image data is saved in a memory, such as the transport memory 36 shown in FIG. 1, for example.

Figure 4:
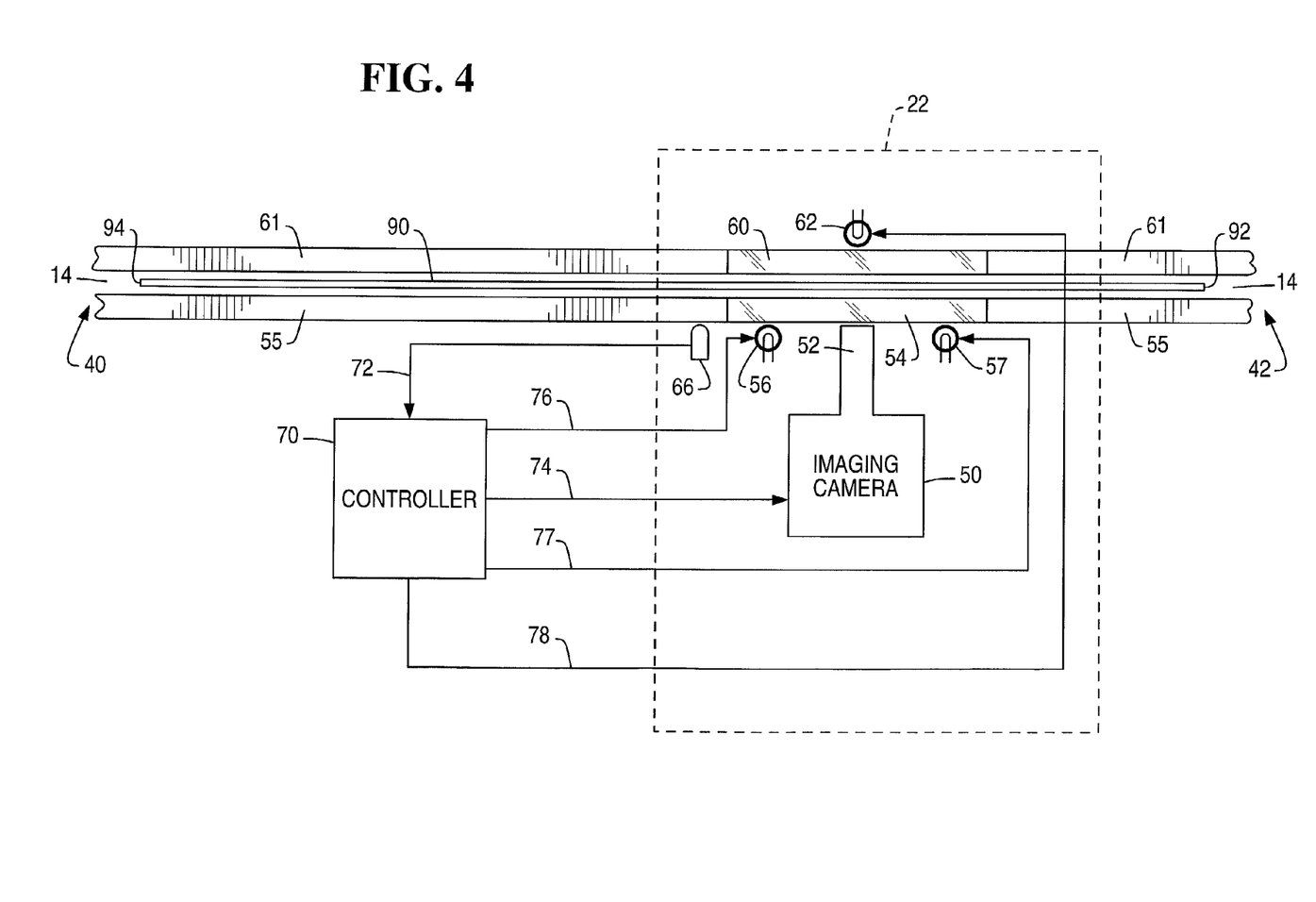
Figure 5:
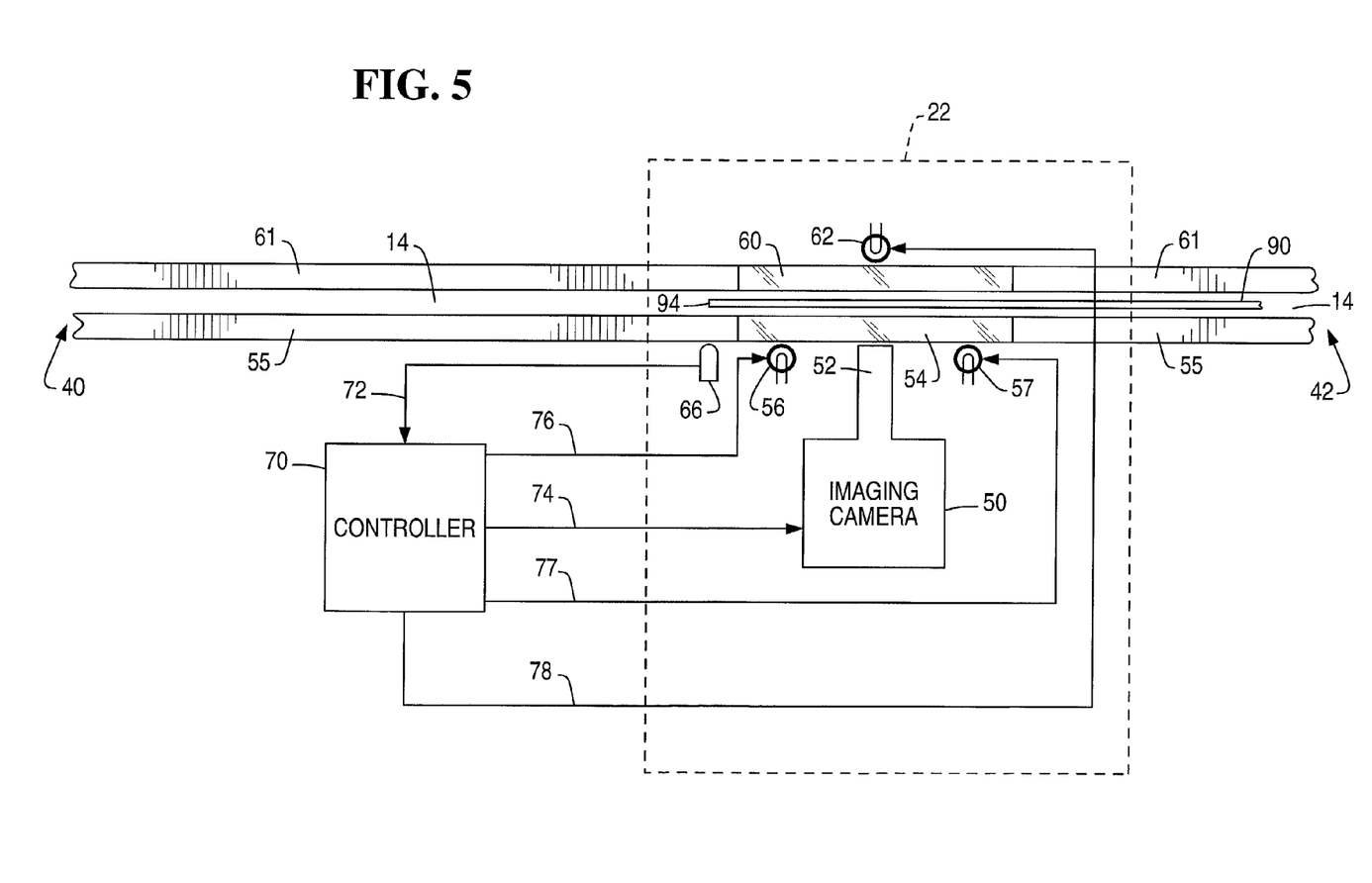
Figure 6:
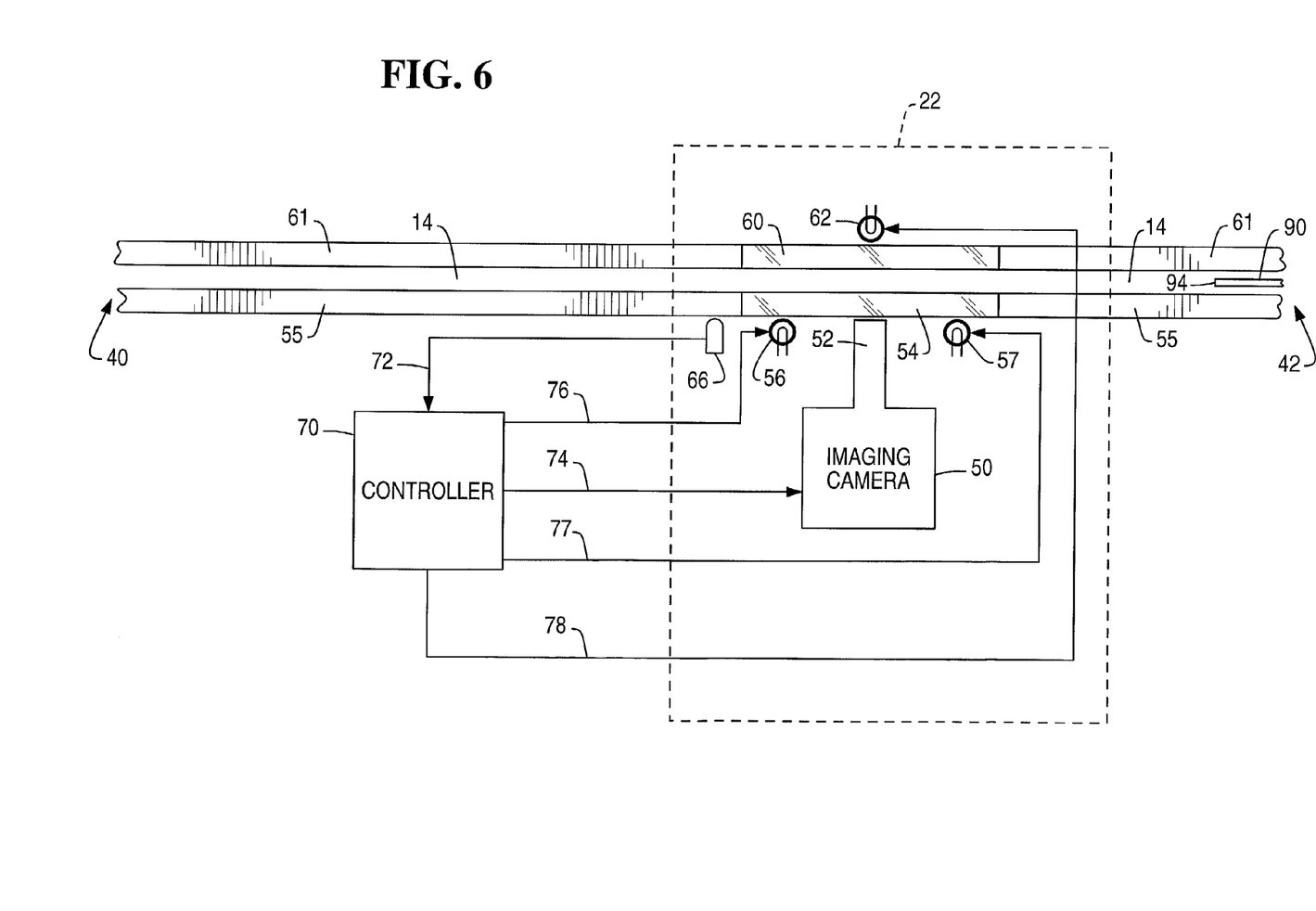

The imaging camera 50 continues to capture image data which is representative of an image of the document item 90 as the document item 90 continues to move downstream along the document track 14, such as shown in FIG. 4. Eventually, a trailing edge 94 of the document item 90 (shown in FIG. 5) moves past the sensor device 66. When the trailing edge of the document item 90 moves past the sensor device 66 as shown in FIG. 5, the sensor device 66 provides a trailing edge signal on line 72 indicative thereof. In response to receiving the signal on line 72 from the sensor device 66, the controller 70 controls the imaging camera 50 to continue scanning and capturing image data which is representative of an image of the document item 90 for a predetermined amount of time. This predetermined amount of time is sufficient to allow the trailing edge 94 of the document item 90 to move well past the lens portion 52 of the imaging camera 50 such as shown in FIG. 6. Accordingly, image data which is representative of an entire image of the document item 90 is captured and stored in memory.

After elapse of the predetermined amount of time, the lighting source 62 is controlled to turn ON, the lighting sources 56, 57 are controlled to turn OFF, and the imaging camera 50 is controlled to continue scanning and to begin detecting the leading edge of the next document item moving downstream along the document track 14. It should be apparent that the imaging camera 50 is continuously scanning. The imaging camera 50 is in the mode of detecting a leading edge of a document item in the document track 14 when no document item is in the document track 14 in front of the lens portion 52. In this mode, the lighting source 62 is ON, and the lighting sources 56, 57 are OFF. The imaging camera 50 goes into the mode of capturing image data after the leading edge of a document item moving past the lens portion 52 is detected. When the imaging camera 50 goes into the mode of capturing image data, the light source 62 is turned OFF and the lighting sources 56, 57 are turned ON. The imaging camera 50 goes back into detection mode after image data which is representative of an entire image of a document item has been captured. When the imaging camera 50 back into detection mode, the lighting source 62 is turned ON, and the lighting sources 56, 57 are turned OFF.

Although the sensor device 66 is described as being part of the image capture module 22, it is contemplated that the sensor device may be located outside of the image capture module and not part of the image capture module. Also, although the translucent reference surface 60 is described as being white plastic material, it is contemplated that the translucent reference surface may a different type of material such as white glass. Also, while it is contemplated that the imaging camera 50 be calibrated against the translucent reference surface 60 when no document item is in or moving along the document track 14, it is conceivable that the imaging camera 50 may be calibrated against the translucent reference surface 60 when document items are moving along the document track 14. In this case, the imaging camera 50 would perform the calibration when the translucent reference surface 60 is exposed to the imaging camera 50 between two document items which are moving along the document track 14 from the upstream end 40 to the downstream end 42.

A number of advantages result by providing an apparatus and method in accordance with the present invention. One advantage is that the leading edge 92 of the document item 90 in the document track 14 is accurately detected, even though the translucent reference surface 60 is white. Another advantage is that the translucent reference surface 60 is stationary. Accordingly, the imaging camera 50 may be calibrated without requiring the use of moving mechanical components.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. An apparatus for use in an image-based document processing system having a document track and a controllable image capture device along the document track, the apparatus comprising:

an energizeable first light source facing the image capture device and for, when energized, illuminating a document item in the document track to allow the image capture device to detect a leading edge of the document item;

an energizeable second light source for, when energized, illuminating the document item in the document track to allow the image capture device to capture an image of the document item; and a translucent reference surface disposed between the first and second light sources and for (i) passing through light from the first light source to the image capture device when the first light source is energized, and (ii) reflecting light from the second light source to the image capture device when the second light source is energized.

2. An apparatus according to claim 1, further comprising a controller for controlling the image capture device and the first and second sources such that (i) the first light source is energized to provide light for passing through the translucent reference surface to the image capture device to allow the image capture device to detect a leading edge of a document item when no document item is in the document track between the first light source and the image capture device, (ii) the second light source is energized to provide light for reflecting from the document item to the imaging capture device to allow the image capture device to capture an image of a document item when a document item is in the document track between the first light source and the image capture device, and (iii) the image capture device is controlled to capture an image of a document item in the document track between the first light source and the image capture device after the image capture device has detected a leading edge of the document item.

3. An apparatus according to claim 1, wherein each of the first and second light sources comprises a linear array of light emitting diodes.

4. An apparatus according to claim 1, wherein the translucent reference surface comprises an entirely white surface without any dark markings thereon.

5. An apparatus according to claim 1, further comprising a sensor device for (i) detecting a trailing edge of a document item in the document track, and (ii) providing a trailing edge signal indicative thereof.

6. An apparatus according to claim 5, wherein the sensor device is located along the document track upstream from the image capture device.

7. An apparatus according to claim 6, further comprising a controller responsive to the trailing edge signal from the sensor and for controlling the image capture device and the first and second light sources such that (i) the first light source is energized to provide light for passing through the translucent reference surface to the image capture device to allow the image capture device to detect a leading edge of a document item when no document item is in the document track between the first light source and the image capture device, (ii) the second light source is energized to provide light for reflecting from the document item to the imaging capture device to allow the image capture device to capture an image of a document item when a document item is in the document track between the first light source and the image capture device, and (iii) the image capture device is controlled to capture an image of a document item in the document track between the first light source and the image capture device after the image capture device has detected a leading edge of the document item.

8. An apparatus comprising:

means defining a document track along which document items move from an upstream end to a downstream end;

a controllable image capture device disposed on a first side of the document track;

a first light source disposed on a second side of the document track and facing the image capture device and for, when energized, illuminating a document item from behind in the document track to allow the image capture device to detect a leading edge of the document item as the document item moves from the upstream end to the downstream end;

a second light source disposed on the first side of the document track;

a translucent reference surface disposed between the first and second light sources and for (i) passing through light from the first light to illuminate the document track to allow the image capture device to detect a leading edge of the document item as the document item moves from the upstream end to the downstream end, and (ii) reflecting light from the second light source to the image capture device to allow the image capture device to be calibrated; and a controller for controlling the image capture device and the first and second light sources such that (i) the first light source provides light for passing through the translucent reference surface to the image capture device to allow the image capture device to detect a leading edge of a document item when no document item is in the document track between the first light source and the image capture device, (ii) the second light source provides light for reflecting from the document item to the imaging capture device to allow the image capture device to capture an image of the document item when the document item is in the document track between the first light source and the image capture device and moving from the upstream end to the downstream end, and (iii) the image capture device is controlled to capture an image of a document item in the document track moving from the upstream end to the downstream end and between the first light source and the image capture device after the image capture device has detected a leading edge of the document item.

9. An apparatus according to claim 8, wherein each of the first and second light sources comprises at least one light emitting diode.

10. An apparatus according to claim 8, wherein the translucent reference surface comprises an entirely white surface without any dark markings thereon.

11. An apparatus according to claim 8, further comprising a sensor device located along the document track upstream from the image capture device and for (i) detecting a trailing edge of a document item moving along the document track from the upstream end to the downstream end, and (ii) providing a trailing edge signal indicative thereof.

12. A check processing system comprising:
means defining at least a portion of a document track along which document items can move from an upstream end to a downstream end;

an image capture module including a controllable image capture device disposed along a first side of the document track and for capturing an image of a document item moving from the upstream end of the document track to the downstream end of the document track;

an energizeable first light source disposed on a second side of the document track and facing the image capture device and for, when energized, illuminating the document item to allow the image capture device to detect a leading edge of the document item as the document item moves from the upstream end to the downstream end;

an energizeable second light source disposed on the first side of the document track and for, when energized, illuminating a document item in the document track to allow the image capture device to capture an image of the document item as the document item moves from the upstream end to the downstream end;

a translucent reference surface disposed between the first and second light sources and for (i) passing through light from the first light source to illuminate a document item in the document track to allow the image capture device to detect a leading edge of the document item as the document item moves from the upstream end to the downstream end, and (ii) reflecting light from the second light source to the image capture device to allow the image capture device to be calibrated; and a pocketing module including at least one pocket for receiving a document item after the image capture device has captured an image of the document item.

13. A check processing system according to claim 12, wherein each of the first and second light sources comprises at least one light emitting diode.

14. A check processing system according to claim 12, wherein the translucent reference surface comprises an entirely white surface without any dark markings thereon.

15. A check processing system according to claim 12, further comprising a sensor device located along the document track upstream from the image capture device and for (i) detecting a trailing edge of a document item moving along the document track from the upstream end to the downstream end, and (ii) providing a trailing edge signal indicative thereof.

16. A check processing system according to claim 15, further comprising a controller responsive to the trailing edge signal from the sensor device and for controlling the image capture device and the first and second light sources such that (i) the first light source is energized to provide light for passing through the translucent reference surface to the image capture device to allow the image capture device to detect a leading edge of a document item when no document item is in the document track between the first light source and the image capture device, (ii) the second light source is energized to provide light for reflecting from the document item to the imaging capture device to allow the image capture device to capture an image of a document item when a document item is in the document track between the first light source and the image capture device and is moving from the upstream end to the downstream end, and (iii) the image capture device is controlled to capture an image of a document item in the document track moving from the upstream end to the downstream end between the first light source an the image capture device after the image capture device has detected a leading edge of the document item.

17. A check processing system according to claim 16, wherein the controller comprises a transport processor for controlling operation of a number of check processing modules of the check processing transport.

* * * * *